US012129710B2

(12) United States Patent
Ogden, Jr. et al.

(10) Patent No.: US 12,129,710 B2
(45) Date of Patent: *Oct. 29, 2024

(54) VARIABLE-STIFFNESS ROLLER SHADE TUBE

(71) Applicant: Lutron Technology Company LLC, Coopersburg, PA (US)

(72) Inventors: Peter W. Ogden, Jr., Breinigsville, PA (US); Robert C. Newman, Jr., Emmaus, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 408 days.

This patent is subject to a terminal disclaimer.

(21) Appl. No.: 17/533,845

(22) Filed: Nov. 23, 2021

(65) Prior Publication Data

US 2022/0081970 A1 Mar. 17, 2022

Related U.S. Application Data

(63) Continuation of application No. 15/974,506, filed on May 8, 2018, now Pat. No. 11,187,033.

(Continued)

(51) Int. Cl.

| | |
|---|---|
| ***E06B 9/44*** | (2006.01) |
| ***E06B 9/72*** | (2006.01) |
| *E06B 9/40* | (2006.01) |

(52) U.S. Cl.

CPC .................. *E06B 9/44* (2013.01); *E06B 9/72* (2013.01); *E06B 2009/405* (2013.01)

(58) Field of Classification Search

CPC ....... B60J 5/08; B60J 5/14; B60J 7/068; B60J 11/02; E06B 2009/405; E06B 9/44; E06B 9/72

See application file for complete search history.

(56) References Cited

U.S. PATENT DOCUMENTS 4,006,770 A 2/1977 Ferguson et al.
4,234,190 A * 11/1980 Airhart .................... F42B 6/04 273/DIG. 7

(Continued)

FOREIGN PATENT DOCUMENTS

CN 102110491 A 6/2011
CN 204137261 U 2/2015

(Continued)

*Primary Examiner* — Johnnie A. Shablack

(74) *Attorney, Agent, or Firm* — Condo Roccia Koptiw LLP

(57) ABSTRACT

A low-deflection roller tube of a motorized roller shade may include a first tube and a second tube that is attached to the first tube. The first tube may be configured to operably couple to the motor drive unit of the roller shade. The second tube may comprise a plurality of carbon fiber layers additively constructed on the first tube, and may be fabricated such that first and second longitudinal portions of the roller tube exhibit different material stiffness characteristics from each other. The first and second portions of the roller tube may be made of carbon fiber material having different tensile moduli. Layers of carbon fiber material in the first portion may be staggered with layers of carbon fiber material in the second portion at an interface between the first and second portions.

20 Claims, 5 Drawing Sheets

Related U.S. Application Data

(60) Provisional application No. 62/502,968, filed on May 8, 2017.

(56) References Cited

U.S. PATENT DOCUMENTS

| | | | | | |
|---|---|---|---|---|---|
| 5,061,533 | A * | 10/1991 | Gomi | F16C 13/00 | 428/113 |
| 5,549,947 | A * | 8/1996 | Quigley | B29C 70/085 | 156/169 |
| 6,983,783 | B2 | 1/2006 | Carmen et al. | | |
| 7,839,109 | B2 | 11/2010 | Carmen, Jr. et al. | | |
| 8,950,461 | B2 | 2/2015 | Ogden, Jr. et al. | | |
| 9,194,671 | B1 * | 11/2015 | Song | F42B 6/04 | |
| 10,272,302 | B2 * | 4/2019 | Mordasini | B29C 53/60 | |
| 11,187,033 | B2 * | 11/2021 | Ogden, Jr. | E06B 9/72 | |
| 11,230,882 | B2 * | 1/2022 | Blair | E06B 9/72 | |
| 2008/0127598 | A1 | 6/2008 | Kallstrom | | |
| 2009/0092426 | A1 | 4/2009 | Nishizawa et al. | | |
| 2009/0098324 | A1 * | 4/2009 | Hasegawa | B29C 70/446 | 156/190 |
| 2009/0242143 | A1 | 10/2009 | Pham | | |
| 2010/0219306 | A1 * | 9/2010 | Detmer | E06B 9/78 | 29/401.1 |
| 2011/0192528 | A1 * | 8/2011 | Kozaki | B29D 23/001 | 156/173 |
| 2013/0153162 | A1 | 6/2013 | Blair et al. | | |
| 2014/0262084 | A1 * | 9/2014 | Fleischman | E04F 10/0607 | 160/368.1 |
| 2014/0305602 | A1 | 10/2014 | Kirby et al. | | |
| 2014/0346811 | A1 * | 11/2014 | Zaluzec | B62D 29/04 | 296/187.12 |
| 2016/0326801 | A1 | 11/2016 | Ogden et al. | | |
| 2017/0298691 | A1 | 10/2017 | Yamagishi et al. | | |
| 2019/0290978 | A1 * | 9/2019 | Mordasini | A63B 60/42 | |
| 2020/0099271 | A1 | 3/2020 | Lemaitre et al. | | |

FOREIGN PATENT DOCUMENTS

| | | | |
|---|---|---|---|
| CN | 111003959 | A | 4/2020 |
| DE | 29913874 | U1 | 11/1999 |
| WO | 2016182963 | A1 | 11/2016 |

* cited by examiner

VARIABLE-STIFFNESS ROLLER SHADE TUBE

CROSS-REFERENCE TO RELATED APPLICATIONS

This application is a continuation of U.S. patent application Ser. No. 15/974,506 filed on May 8, 2018, which claims priority from U.S. Provisional Patent Application No. 62/502,968, filed May 8, 2017, the disclosures of each of which are hereby incorporated by reference herein in their entireties.

BACKGROUND

A window treatment may be mounted in front of one or more windows, for example to prevent sunlight from entering a space and/or to provide privacy. Window treatments may include, for example, roller shades, roman shades, venetian blinds, or draperies. A roller shade typically includes a flexible shade fabric wound onto an elongated roller tube. Such a roller shade may include a weighted hembar located at a lower end of the shade fabric. The hembar may cause the shade fabric to hang in front of one or more windows that the roller shade is mounted in front of.

Advances in window construction technology have enabled the manufacture of windows in ever increasing sizes, such as windows that may be 8 or more feet wide. Such large windows may require similarly large window treatments. For example, a roller shade configured to cover such a wide window may require an unusually long roller tube.

It may be desirable, in manufacturing a roller shade for a wide window, to maintain the aesthetics of a related roller shade that is sized for a smaller window. However, the roller tube of a roller shade that is simply supported at opposed ends of the tube may exhibit increasing deflection from the ends of the tube to the middle of the tube. This phenomenon may be referred to as tube sag. Tube sag may present a limitation to how long the roller tube of a roller shade may be made. And tube sag may become more pronounced as roller tube length increases.

An excess of tube sag may cause a roller shade to exhibit undesirable aesthetic and/or operational characteristics. For example, tube sag may cause visible sag lines to appear in the shade material. Additionally, tube sag may cause the shade material of a roller shade to wrinkle as the shade rolls up. In a roller shade with little to no tube sag, the shade material typically rolls up perpendicular to the roller tube. However, when a roller tube exhibits tube sag, the right half of the shade material may travel leftward and/or the left half of the shade material may travel rightward as the shade rolls up. This may introduce wrinkles into the rolled up shade material.

Known solutions for addressing tube sag in a roller shade may have one or more undesirable characteristics. For example, a first solution may be to increase the tube diameter of a roller tube to achieve an increased stiffness. However, such an enlarged roller tube may require additional space, which may negatively impact the aesthetic of an installation of the roller shade. In another solution, the shade material may be supported at one or more locations along the length of the roller tube. However, movement of the shade material over the supports may cause undesirable wear to the shade material.

SUMMARY

As described herein, the roller tube of a motorized roller shade may be configured as a low-deflection roller tube for use in covering a large opening, such as an opening that is 8 feet wide or wider. The roller tube may define opposed first and second ends, and may be configured to be supported at the first and second ends.

The roller shade may include a motor drive unit and a flexible material that is attached to the roller tube. The flexible material may be operable between a raised position and a lowered position via rotation of the roller tube by the motor drive unit. The roller shade may include a hembar that is attached to a lower end of the flexible material.

In accordance with an example low-deflection configuration, the roller tube of the roller shade may include a first tube and a second tube that is attached to an outer surface of the first tube. The first tube may be made of metal, such as aluminum, steel, or the like. The first tube may be configured to operably couple to the motor drive unit of the roller shade.

The second tube may comprise a plurality of carbon fiber layers, and may be additively constructed on the first tube, for example by roll-wrapping carbon fiber material onto the first tube. The second tube may be fabricated such that a first longitudinal portion of the roller tube exhibits a first material stiffness and a second longitudinal portion of the roller tube exhibits a second material stiffness that is different from the first material stiffness. The first and second portions of the roller tube may be made of carbon fiber material having different tensile moduli. Layers of carbon fiber material in the first portion of the roller tube may be staggered with layers of carbon fiber material in the second portion of the roller tube at an interface of the first and second portions.

BRIEF DESCRIPTION OF THE DRAWINGS

FIG. 10 is a perspective view of the example motorized roller shade depicted in FIG. 1A, with the shade in a lowered position.

DETAILED DESCRIPTION

Figure 1A:
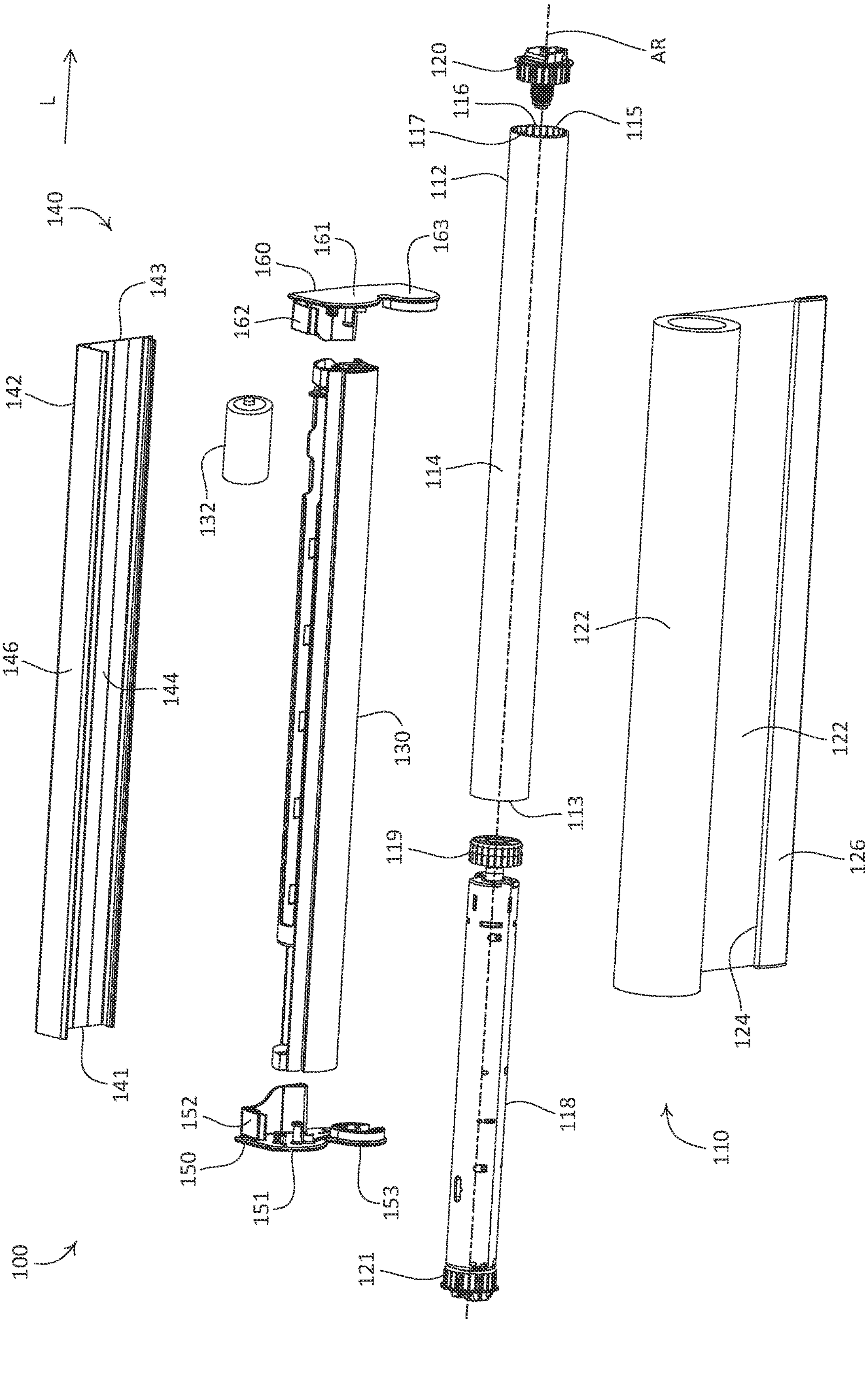
FIG. 1A is an exploded view of an example motorized roller shade for use in an oversized opening, the battery-powered roller shade including an example low-deflection roller tube.
Figure 1B:
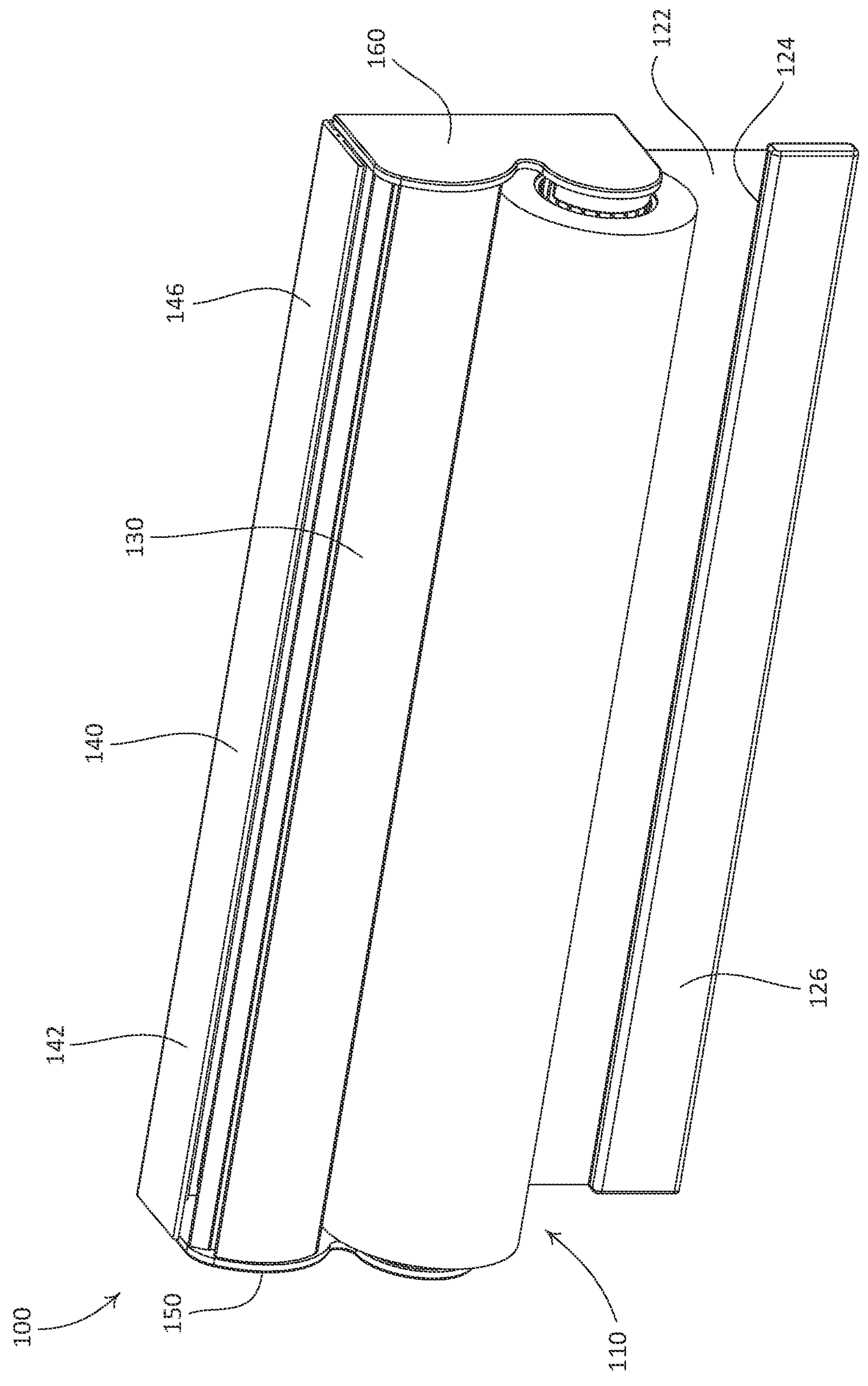
FIG. 1B is a perspective view of the example motorized roller shade depicted in FIG. 1A, with the shade in a raised position.
Figure 1C:
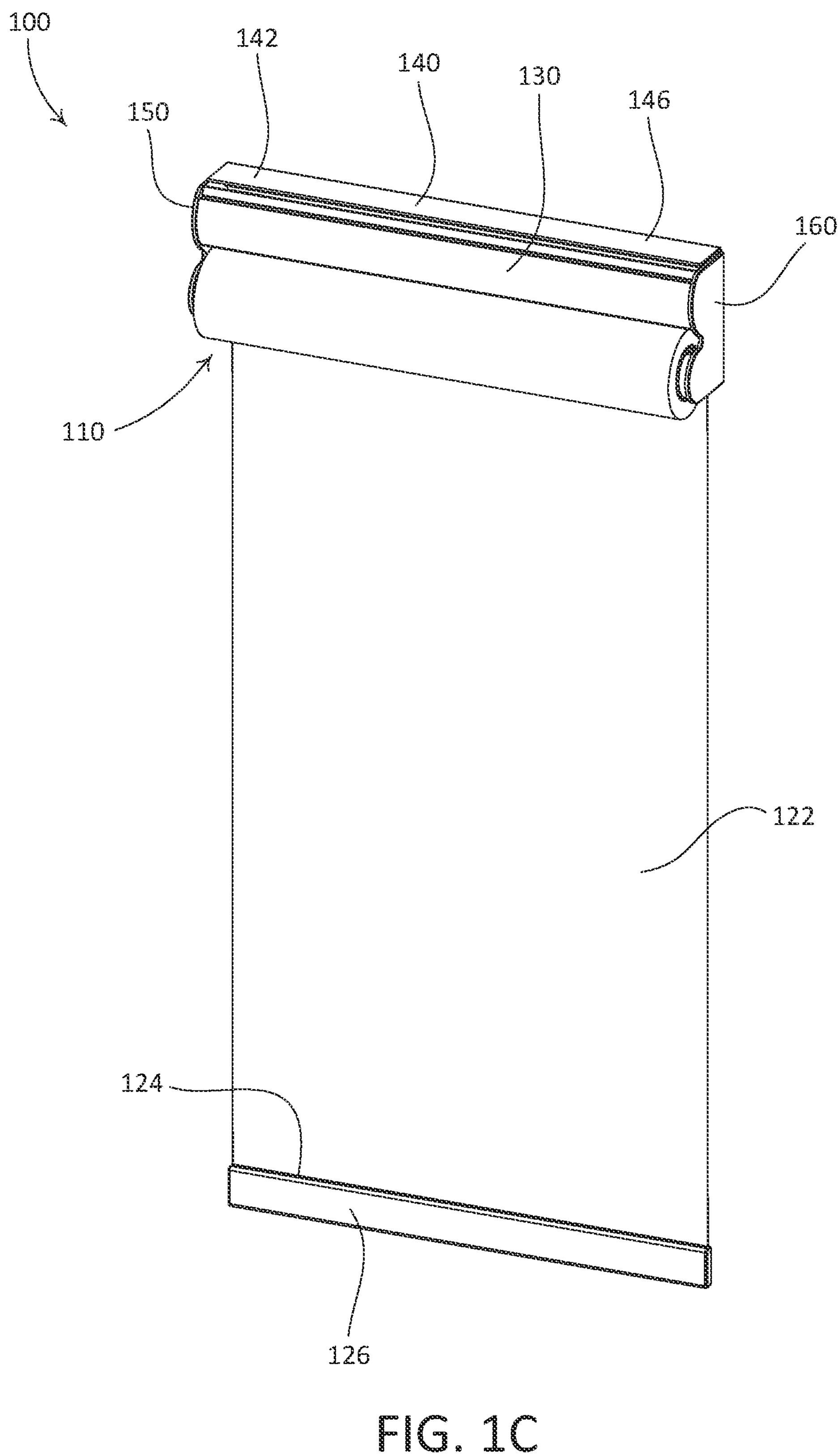

FIGS. 1A-1C depict an example window treatment, in the form of a motorized roller shade 100. The motorized roller shade 100 may be configured to be mounted in front of a large opening, such as one or more windows that span 8 feet or more in width, for example to prevent sunlight from entering a space and/or to provide privacy. The motorized roller shade 100 may be mounted to a structure that is proximate to the opening, such as a window frame, a wall, or other structure. As shown, the motorized roller shade 100 includes a shade assembly 110, a battery compartment 130, and a housing 140 that may be configured to support the shade assembly 110 and the battery compartment 130. The housing 140 may be configured as a mounting structure and/or a support structure for one or more components of the motorized roller shade 100.

As shown, the housing 140 includes a rail 142, a first housing bracket 150, and a second housing bracket 160. The illustrated rail 142 is elongate between a first end 141 and an opposed second end 143. The rail 142, the first housing bracket 150, and the second housing bracket 160 may be configured to attach to one another in an assembled configuration. For example, the first housing bracket 150 may be configured to be attached to the first end 141 of the rail 142, and the second housing bracket 160 may be configured to be attached to the second end 143 of the rail 142. As shown, the first housing bracket 150 defines an attachment member 152 that is configured to engage the first end 141 of the rail 142, and the second housing bracket 160 defines an attachment member 162 that is configured to engage the second end 143 of the rail 142. It should be appreciated that the rail 142, the first housing bracket 150, and the second housing bracket 160 are not limited to the illustrated attachment members.

One or more of the rail 142, the first housing bracket 150, or the second housing bracket 160, may be sized for mounting to a structure. For example, the rail 142 may be sized such that, with the first and second housing brackets 150, 160 attached to the rail 142, the rail 142 may be mounted to a structure in an opening (e.g., to a window frame). In such an example configuration, the rail 142 may define a length, for example as defined by the first and second ends 141, 143, such that the housing 140 may fit snugly in a window frame (e.g., with little clearance between the first and second housing brackets 150, 160 and adjacent structure of a window frame). This configuration may be referred to as an internal mount configuration. In another example, the rail 142 may be sized such that, with the first and second housing brackets 150, 160 attached to the rail 142, the rail 142 may be mounted to a structure above an opening (e.g., to a surface above a window). In such an example configuration, the rail 142 may define a length that is substantially equal to (e.g., slightly longer than) a width of the window opening. In still another example, one or more of the rail 142, the first housing bracket 150, or the second housing bracket 160 may be sized such that the motorized roller shade 100 may be mounted within a cavity defined by a window treatment pocket that may be mounted to a structure, such as structure surrounding a window. It should be appreciated, however, that the motorized roller shade 100 is not limited to these example mounting configurations.

The rail 142 may define any suitable shape. As shown, the rail 142 includes a rear wall 144 and an upper wall 146 that extends outward from an upper edge of the rear wall 144 along a direction that is substantially perpendicular to the rear wall 144. One or both of the rear wall 144 and the upper wall 146 may be configured to be mounted to a structure. The rail 142, the first housing bracket 150, and the second housing bracket 160, when in an assembled configuration, may define a cavity. The shade assembly 110 and the battery compartment 130 may be disposed in the cavity, for example when the motorized roller shade 100 is in an assembled configuration (e.g., as shown in FIGS. 1B and 1C). When the motorized roller shade 100 is in an assembled configuration, the housing 140 may be open at the front and bottom, such that the shade assembly 110 and the battery compartment 130 are exposed. The motorized roller shade 100 may optionally include a fascia (not shown) that is configured to conceal one or more components of the motorized roller shade 100, such as the battery compartment 130 and portions of the shade assembly 110.

As shown, the shade assembly 110 includes a roller tube 112, a motor drive unit 118, an idler 120, a flexible material 122, and a hembar 126. The roller tube 112 may have a tube body 114 that is elongate along a longitudinal direction L from a first end 113 of the roller tube 112 to an opposed second end 115 of the roller tube 112. The tube body 114 may define any shape, such as the illustrated cylindrical shape. As shown, the roller tube 112 is hollow, and open at the first and second ends 113, 115. The roller tube 112 may be configured to at least partially receive the motor drive unit 118, and to at least partially receive the idler 120. As shown, the roller tube 112 is configured such that a portion of the motor drive unit 118 may be disposed in the first end 113, and such that a portion of the idler 120 may be disposed in the second end 115. The roller tube 112 may be used in covering a wide opening (e.g., an opening that is 8 feet wide or wider).

The roller tube 112 may define an inner surface 116 that is configured to operatively engage with the motor drive unit 118. For example, as shown, the roller tube 112 includes a plurality of splines 117 that extend radially inward from the inner surface 116. The roller tube 112 may be configured to operatively engage with the motor drive unit 118 via the plurality of splines 117. For example, the splines 117 may be configured to operatively engage with a component of the motor drive unit 118, such that rotational torque may be transferred to the roller tube 112 from the motor drive unit 118, thereby causing the roller tube 112 to rotate about an axis of rotation AR. The axis of rotation AR of the roller tube 112 may also be referred to as a central axis of the roller tube 112.

The splines 117 may extend parallel to the longitudinal direction L, and may be spaced apart from each other equally, as shown, or unequally along a circumference of the inner surface 116 of the roller tube 112. Each of the illustrated splines 117 extends from the first end 113 to the second end 115 of the roller tube 112. It should be appreciated that the roller tube 112 is not limited to illustrated configuration and/or geometry of splines 117. It should further be appreciated that the roller tube 112 may be alternatively configured to operably engage with the motor drive unit 118. For example, in accordance with an alternative configuration of the roller tube 112, the roller tube 112 may have a smooth inner surface 116, and may include an opening that extends therethrough at a location such that the roller tube 112 may be operatively coupled to the motor drive unit 118 via one or more fasteners that may be disposed into the opening and that may engage the motor drive unit 118 (e.g., such as screws, pins, clips, or the like).

The illustrated motor drive unit 118 may be configured to be disposed into the first end 113 of the roller tube 112. One or more components of the motor drive unit 118 may be configured to engage with the plurality of splines 117 of the roller tube 112. As shown, the motor drive unit includes a drive hub 119 that defines a plurality of grooves that are configured to operably engage with corresponding ones of the splines 117, such that operation of the motor drive unit 118 may cause the roller tube 112 to rotate. The motor drive unit 118 may further include an integrated idler 121 that defines a plurality of grooves that are configured to engage with corresponding ones of the splines 117. The idler 120 may similarly define a plurality of grooves that are configured to engage with corresponding ones of the splines 117. The grooves of the drive hub 119 and the idler 120 may be spaced apart from each other equally, as shown, or unequally along the circumferences of respective outer surfaces of the drive hub 119 and the idler 120.

As shown, the flexible material 122 may be a material suitable for use as a shade fabric, and may be alternatively referred to as a covering material. However, it should be appreciated that the flexible material is not limited to shade fabric. For example, in accordance with an alternative implementation of the motorized roller shade 100 as a retractable projection screen, the flexible material 122 may be a material suitable for displaying images projected onto the flexible material 122. The flexible material 122 may define an upper end (not shown) that is configured to be operably attached to the roller tube 112, and an opposed lower end 124 that is configured as a free end. Rotation of the roller tube 112 about the axis of rotation AR, for example rotation caused by the motor drive unit 118, may cause the flexible material 122 to wind onto, or to unwind from, the roller tube 112. In this regard, the motor drive unit 118 may adjust the flexible material 122, for instance between raised and lowered positions of the flexible material 122 as shown in FIGS. 1B and 1C, respectively.

Rotation of the roller tube 112 in a first direction about the axis of rotation AR may cause the flexible material 122 to unwind from the roller tube 112, for example as the flexible material 122 is operated to a lowered position relative to an opening (e.g., a window). FIG. 10 depicts the motorized roller shade 100 with the flexible material 122 in a lowered position. Rotation of the roller tube 112 in a second direction, about the axis or rotation AR, that is opposite the first direction may cause the flexible material 122 to wind onto the roller tube 112, for example as the flexible material 122 is operated to a raised position relative to the opening. FIG. 1B depicts the motorized roller shade 100, with the flexible material 122 in a raised position.

The flexible material 122 may be made of any suitable material, or combination of materials. For example, the flexible material 122 may be made from one or more of "scrim," woven cloth, non-woven material, light-control film, screen, or mesh. The hembar 126 may be attached to the lower end 124 of the flexible material 122, and may be weighted, such that the hembar 126 causes the flexible material 122 to hang (e.g., vertically) in front of one or more windows.

The motor drive unit 118 may be configured to enable control of the rotation of the roller tube 112, for example by a user of the motorized roller shade 100. For example, a user of the motorized roller shade 100 may control the motor drive unit 118 such that the flexible material 122 is moved to a desired position. The motor drive unit 118 may include a sensor that monitors a position of the roller tube 112. This may enable the motor drive unit 118 to track a position of the flexible material 122 relative to respective upper and lower limits of the flexible material 122. The upper and lower limits may be specified by an operator of the motorized roller shade 100, and may correspond to the raised and lowered positions of the flexible material 122, respectively.

The motor drive unit 118 may be manually controlled (e.g., by actuating one or more buttons) and/or wirelessly controlled (e.g., using an infrared (IR) or radio frequency (RF) remote control unit). Examples of motor drive units for motorized roller shades are described in greater detail in U.S. Pat. No. 6,983,783, issued Jan. 10, 2006, entitled "Motorized Shade Control System," U.S. Pat. No. 7,839,109, issued Nov. 23, 2010, entitled "Method Of Controlling A Motorized Window Treatment," U.S. Pat. No. 8,950,461, issued Jan. 21, 2015, entitled "Motorized Window Treatment," and U.S. Patent Application Publication No. 2013/0153162, published Jun. 20, 2013, entitled "Battery-Powered Motorized Window Treatment Having A Service Position," the entire contents of each of which are incorporated herein by reference. It should be appreciated, however, that any motor drive unit or drive system may be used to control the roller tube 112.

The motorized roller shade 100 may include an antenna (not shown) that is configured to receive wireless signals (e.g., RF signals from a remote control device). The antenna may be in electrical communication with the motor drive unit 118 (e.g., via a control circuit or PCB), such that one or more wireless signals received from a remote control unit may cause the motor drive unit 118 to move the flexible material 122 (e.g., between the lowered and raised positions). The antenna may be integrated with (e.g., pass through, be enclosed within, and/or be mounted to) one or more of the shade assembly 110, the battery compartment 130, the housing 140, or respective components thereof.

The battery compartment 130 may be configured to retain one or more batteries 132. The illustrated battery 132 may be, for example, a D cell (e.g., IEC R20) battery. One or more components of the motorized roller shade 100, such as the motor drive unit 118, may be powered by the one or more batteries 132. However, it should be appreciated that the motorized roller shade 100 is not limited to the illustrated battery-powered configuration. For example, the motorized roller shade 100 may be alternatively configured such that one or more components thereof, such as the motor drive unit 118, may be powered by an alternating current (AC) source, a direct current (DC) source, or any combination of power sources.

The battery compartment 130 may be configured to be operable between an opened position and a closed position, such that one or more batteries 132 may be accessible when the battery compartment 130 is in the opened position. Examples of battery compartments for motorized roller shades are described in greater detail in U.S. Patent Application Publication No. 2014/0305602, published Oct. 16, 2014, entitled "Integrated Accessible Battery Compartment For Motorized Window Treatment," the entire content of which is incorporated herein by reference.

The housing 140 may be configured to support one or both of the shade assembly 110 and the battery compartment 130. For example, the first and second housing brackets 150, 160 may be configured to support the shade assembly 110 and/or the battery compartment 130. As shown, the first and second housing brackets 150, 160 are configured to support the shade assembly 110 and the battery compartment 130 such that the battery compartment 130 is located (e.g., is oriented) above the shade assembly 110 when the motorized roller shade 100 is mounted to a structure. It should be appreciated that the motorized roller shade 100 is not limited to the illustrated orientation of the shade assembly 110 and the battery compartment 130. For example, the housing 140 may be alternatively configured to otherwise support the shade assembly 110 and the battery compartment 130 relative to each other (e.g., such that the battery compartment 130 is located below the shade assembly 110).

As shown, the first housing bracket 150 defines an upper portion 151 and a lower portion 153, and the second housing bracket 160 defines an upper portion 161 and a lower portion 163. The upper portion 151 of the first housing bracket 150 may be configured to support a first end of the battery compartment 130, and the upper portion 161 of the second housing bracket 160 may be configured to support a second end of the battery compartment 130. The upper portions 151, 161 of the first and second housing brackets 150, 160, respectively, may be configured to operably support the support the battery compartment 130, such that the battery compartment 130 is operable to provide access to one or more batteries 132 when the motorized roller shade 100 is mounted to a structure.

The lower portion 153 of the first housing bracket 150 may be configured to support the idler 121, and thus the first end 113 of the tube body 114 of the roller tube 112. The lower portion 163 of the second housing bracket 160 may be configured to support the idler 120, and thus the second end 115 of the tube body 114 of the roller tube 112. The lower portions 153, 163 of the first and second housing brackets 150, 160, respectively, may be configured to operably support the support the shade assembly 110, such that the flexible material 122 may be moved (e.g., between the lowered and raised positions). Because the roller tube 112 is supported at the first and second ends 113, 115 thereof, it may be stated that the shade assembly 110, and thus the roller tube 112, is simply supported by the housing 140.

The housing 140 may be configured to be mounted to a structure using one or more fasteners (e.g., one or more screws). For example, one or more of the rail 142, the first housing bracket 150, or the second housing bracket 160 may define one or more respective apertures that are configured to receive fasteners.

The components of the housing 140 may be made of any suitable material or combination of materials. For example, the rail 142 may be made of metal and the first and second housing brackets 150, 160 may be made of plastic. Although the illustrated housing 140 includes separate components, it should be appreciated that the housing 140 may be otherwise constructed. For example, the rail 142, the first housing bracket 150, and the second housing bracket 160 may be monolithic. In another example, the rail may include first and second rail sections that may be configured to attach to one another. In such an example configuration, the first rail section may include an integrated first housing bracket and the second rail section may include an integrated second housing bracket. One or more components of the housing 140 (e.g., one or more of the rail 142, the first housing bracket 150, or the second housing bracket 160) may be wrapped in a material (e.g., fabric), for instance to enhance the aesthetics of the housing 140.

The motorized roller shade 100 may be configured for use in covering an atypically large opening, such as a window, or cluster of windows, having a width greater than 8 feet, and up to about 15 feet wide, such as about 12 feet wide. In such an application, the roller tube 112 may be susceptible to an amount of tube sag that may negatively impact the aesthetic of the flexible material 122 and/or the functionality of the motorized roller shade, such as raising or lowering the flexible material 122. One or more components of the motorized roller shade 100 may be configured to mitigate the occurrence of tube sag. For example, the roller tube 112 may be configured as a low-deflection roller tube.

Figure 2A:
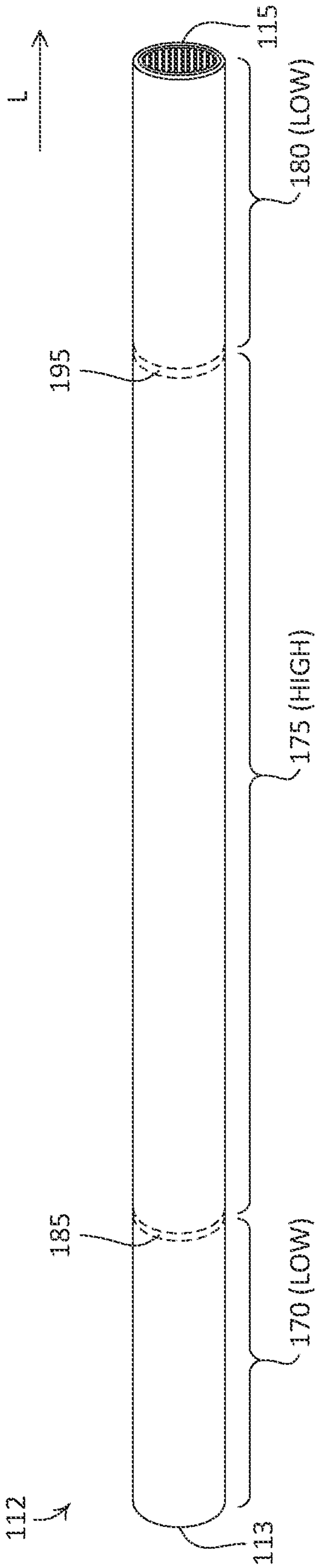
FIG. 2A is a perspective view of a first example low-deflection configuration of an example roller tube component of the example motorized roller shade depicted in FIG. 1A.
Figure 2B:
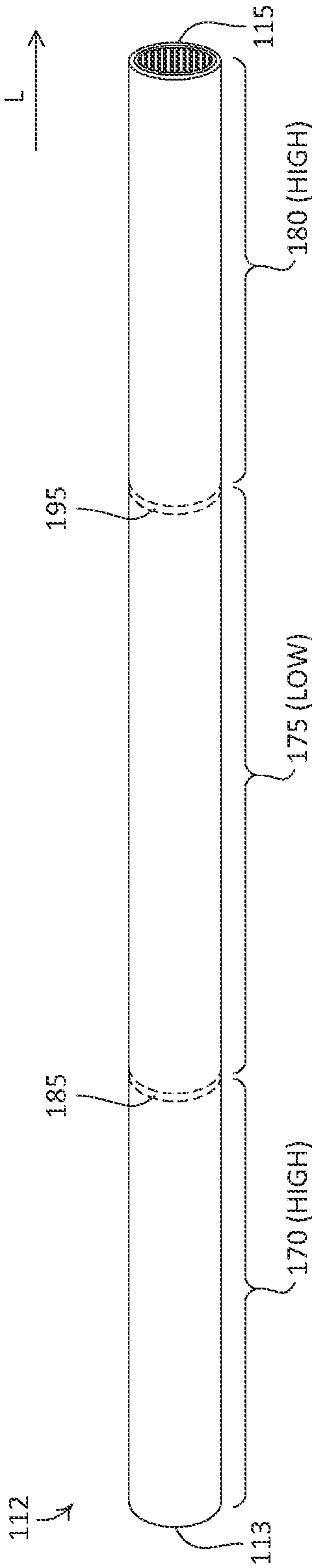
FIG. 2B is a perspective view of a second example low-deflection configuration of the example roller tube of the example motorized roller shade depicted in FIG. 1A.

FIGS. 2A and 2B depict example low-deflection configurations of the roller tube 112. In accordance with the illustrated examples, the tube body 114 of the roller tube 112 may be constructed of one or more materials that exhibit high strength and low density, such as carbon fiber. For example, the tube body 114 may be constructed from one or more layers of the same material, such as a plurality of layers of carbon fiber fabric. In an example of fabricating the roller tube 112, a plurality of layers of carbon fiber material may be applied in succession such that the tube body 114 is additively built-up via the layers of carbon fiber fabric. Alternatively, the tube body 114 may be constructed from one or more layers of different materials, such as carbon fiber material and fiberglass material. For example, one or more layers of a first material may be additively constructed and one or more layers of a second material may be additively constructed over the one or more layers of the first material.

The roller tube 112 may be fabricated using layers of carbon fiber fabric having any suitable combination of modulus types, fiber orientations relative to each other and/or to a central axis of the roller tube 112, and/or material thicknesses. For example, the carbon fiber layers of the tube body 114 may include one or more layers of high modulus carbon fiber, intermediate modulus carbon fiber, low modulus carbon fiber, or the like in any combination. It should be appreciated that fabrication of the tube body 114 of the roller tube 112 is not limited to the use of carbon fiber material throughout. For example, an alternative material, such as fiberglass, may be substituted for low modulus carbon fiber in one or more portions and/or corresponding layers of the tube body 114. It should further be appreciated that the tube body 114 of the roller tube 112 may be constructed of (e.g., at least partially made up of) materials other than carbon fiber or fiberglass, but which may share one or more similar properties or characteristics to carbon fiber or fiberglass. To illustrate, the roller tube 112 may include a material such as a steel-reinforced fabric, which may have a modulus similar to carbon fiber, but a different density (e.g., which may result in a greater weight).

In accordance with the illustrated example low-deflection configurations, the roller tube 112 may be configured such that the material stiffness of the roller tube 112 varies along the longitudinal direction L. For example, the roller tube 112 may be fabricated such that two or more lengthwise portions thereof are defined that exhibit different material stiffness characteristics. The lengthwise portions may be sections or lengths of the tube body 114 in the longitudinal direction L. To illustrate, the tube body 114 of the roller tube 112 may define an end portion 170 that extends from the first end 113 of the roller tube 112 toward the second end 115, an end portion 180 that extends from the second end 115 of the roller tube 112 toward the first end 113, and an intermediate portion 175 that extends between the end portions 170, 180. For the purposes of the instant description, the intermediate portion 175 may be referred to as a first portion of the roller tube 112, the end portion 170 may be referred to a second portion of the roller tube 112, and the end portion 180 may be referred to as a third portion of the roller tube 112.

As shown in FIGS. 2A and 2B, the roller tube 112 may be configured such that the end portions 170 and 180 are of substantially equal length along the longitudinal direction L relative to each other. In this regard, the end portions 170 and 180 may be configured such that the roller tube 112 is symmetric along the longitudinal direction L (e.g., relative a plane that extends perpendicular to the axis of rotation AR at a midpoint of the roller tube 112). It should be appreciated however, that the roller tube 112 may be alternatively configured, for example such that the end portions 170 and 180 have different lengths, and thus such that the roller tube 112 is asymmetric along the longitudinal direction L. The respective lengths of the end portions 170 and 180 may be the same or different from the length of the intermediate portion 175. For example, the roller tube 112 may be configured such that the length of the intermediate portion 175 is longer the length of the end portion 170 and longer than the length of the end portion 180 as shown in FIGS. 2A and 2B.

The roller tube 112 may be fabricated such that the material stiffness of the intermediate portion 175 differs from the material stiffness of the end portions 170, 180, and such that the material stiffness of the end portion 170 is substantially the same as the material stiffness of the end portion 180. For example, as shown in FIG. 2A the end portions 170, 180 of the roller tube 112 may include one or more layers of low modulus carbon fiber (e.g., exhibiting a tensile modulus of about 34 million pounds per square inch (MSI)) and the intermediate portion 175 of the roller tube 112 may include one or more layers of high modulus carbon fiber (e.g., exhibiting a tensile modulus of 55 MSI or higher). In another example, as shown in FIG. 2B the end portions 170, 180 of the roller tube 112 may include one or more layers of high modulus carbon fiber (e.g., exhibiting a tensile modulus of 55 MSI or higher) and the intermediate portion 175 of the roller tube 112 may include one or more layers of low modulus carbon fiber (e.g., exhibiting a tensile modulus of about 34 MSI). It should be appreciated, however, that the roller tube 112 is not limited to the example low-deflection configurations illustrated and described herein. For example, the roller tube 112 may be fabricated to define more or fewer portions of differing material stiffness.

Each portion of the tube body 114 may include layers of material (e.g., carbon fiber material) having the same or different stiffness characteristics (e.g., tensile moduli). For example, one or more portions of the tube body 114 may be homogenously constructed of layers of carbon fiber material having the same tensile modulus, and one or more portions of the tube body 114 may be heterogeneously constructed of layers of carbon fiber material having different respective tensile moduli. It should be appreciated that tensile modulus, as used herein, may represent elastic modulus, modulus of elasticity, and/or Young's modulus.

Figure 3:
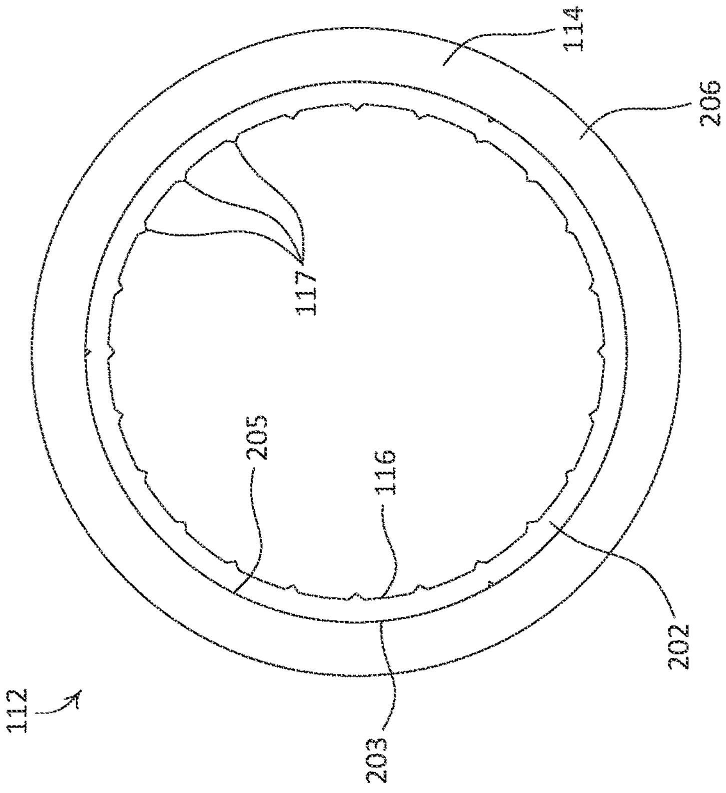
FIG. 3 is an end view of the example roller tube configuration depicted in FIG. 2A.

FIG. 3 depicts an end view of the example low-deflection configuration of the roller tube 112 illustrated in FIG. 2A. As shown, the roller tube 112 may be configured as a two-part roller tube 112 that includes a first tube 202 and a second tube 206 that comprises the tube body 114. The first tube 202 may be referred to as an inner tube of the roller tube 112, and the second tube 206 may be referred to as an outer tube of the roller tube 112. The first and second tubes 202, 206 may be of the same or different lengths (e.g., as defined by respective first and second ends thereof).

The first tube 202 may be made of any suitable material, such as metal. For example, the first tube 202 may be made of aluminum, steel, or the like. The first tube 202 may have an inner surface 201 that defines the inner surface 116 of the roller tube 112, and an opposed outer surface 203 that is radially spaced from the inner surface 201. The inner surface 201 of the first tube 202 may be configured to operatively engage with the motor drive unit 118 of the motorized roller shade 100. For example, as shown, the first tube 202 defines a plurality of splines 117 that extend radially inward from the inner surface 201. The roller tube 112 may be configured to operatively engage with the motor drive unit 118 via the plurality of splines 117. For example, the splines 117 may be configured to operatively engage with respective grooves of the drive hub 119 and the idler 121.

The splines 117 may extend parallel to the longitudinal direction L, and may be spaced apart from each other equally, as shown, or unequally along a circumference of the inner surface 201 of the first tube 202. Each of the illustrated splines 117 may extend from the first end to the second end of the first tube 202. It should be appreciated that the first tube 202 is not limited to the illustrated configuration and/or geometry of splines 117. It should further be appreciated that the first tube 202 may be alternatively configured to operably engage with the motor drive unit 118.

The second tube 206, which may comprise the tube body 114 of the roller tube 112, may be additively constructed on the first tube 202. For example, the second tube 206 may be constructed from one or more layers of carbon fiber material, such as a plurality of layers of carbon fiber fabric that are applied in succession, for example roll-wrapped onto the outer surface 203 of the first tube 202 such that the second tube 206 is additively built-up via the layers of carbon fiber fabric. The roller tube 112 may be fabricated such that the material stiffness of the roller tube 112 varies along the length of the roller tube 112, for instance in accordance with the example low-deflection configurations illustrated in FIGS. 2A and 2B. An inner surface 205 of the second tube 206 may be attached to the outer surface 203 of the first tube 202, for example during a curing process of the carbon fiber material. Because the first and second tubes 202, 206 may be made of different materials (e.g., metal and carbon fiber, respectively), the roller tube 112 may be referred to as a hybrid roller tube.

One or both of the first and second tubes 202, 206 may be configured such that an outer diameter OD of the second tube 206, and thus of the roller tube 112, does not exceed 2 inches, for example to maintain an aesthetic of the motorized roller shade 100, and/or to ensure that when the flexible material 122 is fully wound onto the roller tube 112, the roller tube 112 and flexible material 122 do not exceed a desired volume (e.g., the volume within a pocket in which the motorized roller shade 100 is installed). In an example implementation, the roller tube 112 may define an outer diameter of about 1.67 inches to about 2 inches, such as exactly 2 inches, and an inner diameter of about 1.53 inches to about 1.75 inches, such as exactly 1.75 inches.

At one or more interfaces of adjacent portions of the roller tube 112, such as a first interface 185 of the end portion 170 and the intermediate portion 175 and a second interface 195 of the intermediate portion 175 and the end portion 180, the respective ends of one or more layers of carbon fiber fabric in the adjacent interfacing portions may be staggered relative to each other. In addition, the first and second interfaces 185, 195 may each comprise a number of sub-regions having varying tensile modulus, for example, to provide a gradual change in the modulus of the roller tube 112 between the tensile modulus of the end portions 170, 180 and the tensile modulus of the intermediate portion 175. For example, each of the sub-regions of the first and second interfaces 185, 195 may define a step change in the tensile modulus (e.g., as compared to the adjacent sub-regions) that is smaller than the difference between the tensile modulus of the end portions 170, 180 and the tensile modulus of the intermediate portion 175.

Figure 4:
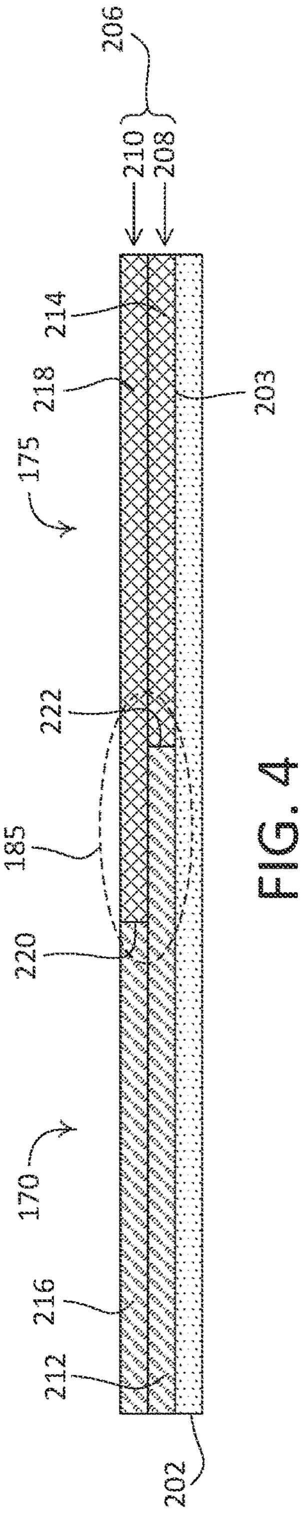
FIG. 4 is a cross section view of an interface between portions of differing material stiffness of the example roller tube configuration depicted in FIG. 2A.

For example, as shown in FIG. 4, a base layer 208 of carbon fiber material may be applied to (e.g., roll-wrapped onto) the outer surface 203 of the first tube 202. The base layer 208 may comprise a first sheet 212 of carbon fiber material that forms a part of the end portion 170 of the tube body 114, and a second sheet 214 of carbon fiber material that forms a part of the intermediate portion 175 of the tube body 114. One or more additional layers of carbon fiber material, such as the illustrated second layer 210, may be additively applied to build up the tube body 114. The second layer 210 may comprise a third sheet 216 of carbon fiber material that forms another part of the end portion 170, and a fourth sheet 218 of carbon fiber material that forms another part of the intermediate portion 175. As shown, the first, second, third, and fourth sheets 212, 214, 216, 218 of carbon fiber material may be configured such that a first location 220 where the first sheet 212 of carbon fiber material abuts the second sheet 214 is staggered along the longitudinal direction L from a second location 222 where the third sheet 216 of carbon fiber material abuts the fourth sheet 218. For example, one or more layers of the end portion 170 may overlap one or more layers of the intermediate portion 175 such that the layers of carbon fiber material are staggered. As illustrated, the first sheet 212 of carbon fiber material 212 may be overlapped by the fourth sheet 218 of carbon fiber material.

It should be appreciated that the second tube 206 of the roller tube 112 (i.e., the tube body 114) is not limited to two layers of carbon fiber material as illustrated. For example, the second tube 206 may be fabricated from a plurality of layers of carbon fiber material (e.g., comprising three, four, five, six, or more layers). It should further be appreciated that the second tube 206 is not limited to the illustrated spacing between the first and second locations 220 and 222. It should further still be appreciated that corresponding layers of carbon fiber material in the second interface 195 that includes the intermediate portion 175 and the end portion 180 may be staggered in a pattern that is the same or different from the illustrated staggering of the first interface 185. It should further still be appreciated that staggered first and second interfaces 185, 195 may be implemented for the example low-deflection configuration of the roller tube 112 illustrated in FIG. 2B.

Figure 5:
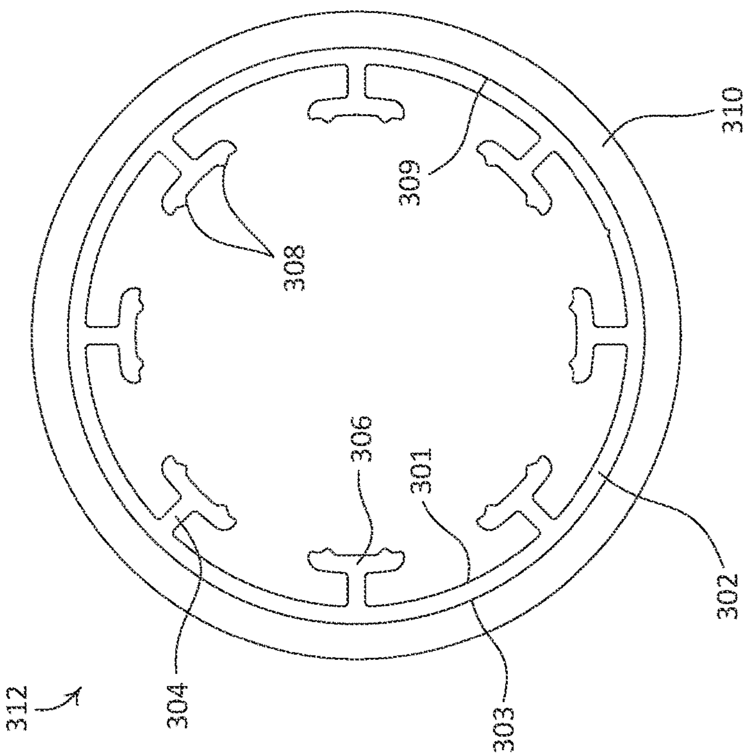
FIG. 5 is an end view of another example low-deflection roller tube that may be implemented in the example motorized roller shade depicted in FIG. 1A.

FIG. 5 depicts an end view of another example low-deflection roller tube 312 that may be used in covering a wide opening (e.g., an opening that is 8 feet wide or wider). The roller tube 312 may be implemented, for example, in the motorized roller shade 100 (e.g., in the place of the roller tube 112). As shown, the roller tube 312 may be a two-part roller tube that includes a first tube 302 and a second tube 310. The second tube 310 may be configured similarly, for example, to the second tube 206 (i.e., the tube body 114) of the roller tube 112. The first tube 302 may be referred to as an inner tube of the roller tube 312, and the second tube 310 may be referred to as an outer tube of the roller tube 312. The first and second tubes 302, 310 may be of the same or different lengths (e.g., as defined by respective first and second ends thereof).

The first tube 302 may be made of any suitable material, such as metal. For example, the first tube 302 may be made of aluminum, steel, or the like. The first tube 302 may define an inner surface 301 and an opposed outer surface 303 that is radially spaced from the inner surface 301. The first tube 302 may be configured to operatively engage with a motor drive unit, such as the motor drive unit 118 of the motorized roller shade 100. For example, the first tube 302 may define one or more engagement members that extend from the inner surface 301.

As shown, the first tube 302 may define a plurality of engagement arms 304 that extend radially inward from the inner surface 301. The plurality of engagement arms 304 may extend between the first and second ends of the first tube 302, for example from the first end to the second end. Each of the plurality of engagement arms 304 may include an engagement pad 306 that defines one or more splines 308. The engagement pads 306 may be spaced from the inner surface 301, such that the second tube 310 is located in a favorable location to maximize a moment of inertia of the second tube 310. As shown, each engagement pad 306 may define a pair of splines 308 extending therefrom. The roller tube 312 may be configured to operatively engage with the motor drive unit 118 via the splines 308 of the plurality of engagement arms 304. For example, the splines 308 may be configured to operatively engage with respective grooves of the drive hub 119 and/or the idler 121.

The splines 308 may extend parallel to the longitudinal direction L. The engagement arms 304 may be spaced apart from each other equally, as shown, or unequally along a circumference of the inner surface 301 of the first tube 302. Each of the illustrated splines 308 may extend from the first end to the second end of the first tube 302. It should be appreciated that the first tube 302 is not limited to the illustrated configuration and/or geometry of engagement members (e.g., engagement arms 304) and/or splines 308. It should further be appreciated that the first tube 302 may be alternatively configured to operably engage with the motor drive unit 118.

The second tube 310 may be fabricated similarly, for example, to the second tube 206 (i.e., the tube body 114) of the roller tube 112. For example, the second tube 310 may be constructed from one or more layers of carbon fiber material, such as a plurality of layers of carbon fiber fabric that are applied in succession, for example roll-wrapped, onto the outer surface 303 of the first tube 302 such that the second tube 310 is additively built-up via the plurality of layers of carbon fiber fabric.

The roller tube 312 may be fabricated such that the material stiffness of the roller tube 312 varies along the length of the roller tube 312, for instance similarly to the example low-deflection configurations of the roller tube 112 illustrated in FIGS. 2A and 2B. For example, the roller tube 312 may be fabricated such that two or more lengthwise portions thereof are defined that exhibit different material stiffness characteristics. At one or more interfaces of adjacent portions of the roller tube 312 having different material stiffness, the respective ends of one or more layers of carbon fiber fabric in the adjacent interfacing portions may be staggered relative to each other, for example similarly to the staggering illustrated and described herein for the roller tube 112. An inner surface 309 of the second tube 310 may be attached to the outer surface 303 of the first tube 302, for example during a curing process of the carbon fiber material. For example, the inner surface 309 of the second tube 310 may be attached to the outer surface 303 of the first tube 302 when the carbon fiber material is cured. Because the first and second tubes 302, 310 may be made of different materials (e.g., metal and carbon fiber, respectively), the roller tube 312 may be referred to as a hybrid roller tube.

One or both of the first and second tubes 302, 310 may be configured such that an outer diameter OD of the second tube 310, and thus of the roller tube 312, does not exceed 2 inches, for example to maintain an aesthetic of the motorized roller shade 100, and/or to ensure that when the flexible material 122 is fully wound onto the roller tube 312, the roller tube 312 and flexible material 122 do not exceed a desired volume (e.g., the volume within a pocket in which the motorized roller shade 100 is installed). In an example implementation, the roller tube 312 may define an outer diameter of about 1.67 inches to about 2 inches, such as exactly 2 inches, and an inner diameter of about 1.53 inches to about 1.75 inches, such as exactly 1.75 inches.

It should be appreciated that fabricating a roller tube such that the roller tube exhibits variable material stiffness along its length, for example in accordance with the example low-deflection roller tubes 112, 312, may enable at least partial control of the deflection behavior of the roller tube when installed with a shade material attached thereto, thereby enabling reduction of the effects of tube sag in the roller tube. Additionally, additively constructing the carbon fiber tube body of a hybrid roller tube using sheets of carbon fiber fabric having different tensile moduli may allow enhanced stiffness and/or other advantageous properties contributed by carbon fiber material to be located where a maximum benefit will be derived therefrom, and may control costs of materials and/or manufacturing, for example by allowing carbon fiber material of lower modulus, which is typically lower cost, to be used as "filler" material in locations where the benefits of using high modulus carbon fiber material are unlikely to be realized. To illustrate, it may be advantageous to construct a variable-stiffness roller tube such that higher stiffness material is located near the middle of the roller tube (e.g., between opposed ends of the roller tube), for example if the roller tube is simply supported at the ends. Furthermore, it may be advantageous to construct a variable-stiffness roller tube such that higher stiffness material is located near the opposed ends of the roller tube, for example if the roller tube is supported in a cantilever configuration.

It should further be appreciated that the fabrication of a low-deflection roller tube that exhibits variable material stiffness along its length is not limited to additively constructing the carbon fiber tube body onto a first tube of a different material, for instance as described herein in accordance with the example low-deflection roller tubes 112, 312. Alternatively, the carbon fiber tube body may be constructed by roll-winding carbon fiber fabric onto a mandrel such that the tube body is additively built-up via the layers of carbon fiber fabric. The mandrel may be configured to define one or more splines in an inner surface of the tube body. When winding of the carbon fiber layers about the mandrel is completed, the carbon fiber material may be cured. Once the carbon fiber material is cured, the mandrel may be removed from the roller tube.

It should further be appreciated that low-deflection roller tubes having variable stiffness are not limited to the illustrated two-part roller tube configurations (e.g., the roller tubes 112 and 312). For example, a low-deflection roller tube with variable stiffness may alternatively be configured omitting the inner tube. To illustrate, the roller tube 112 may alternatively be constructed as a one-part roller tube, omitting the first tube 202. Such a one-part low deflection roller tube may be fabricated, for example, by roll-winding one or more materials (e.g., carbon fiber fabric, fiberglass, etc.) having the same or different tensile moduli onto a mandrel as described herein.

It should be appreciated that the example motorized roller shade 100 illustrated and described herein is not limited to use as a window treatment, and that the motorized roller shade 100 may be implemented for uses other than covering openings (e.g., windows). For instance, the example motorized roller shade 100 having a low-deflection carbon fiber roller tube may be alternatively configured to function as a motorized projection screen (e.g., by replacing the flexible material with a projection screen material).

The invention claimed is:

1. A roller tube for a motorized window treatment, the roller tube comprising:
- a first portion exhibiting a first material stiffness;
- a second portion exhibiting a second material stiffness that is different from the first material stiffness; and
- an interface of the first portion and the second portion, wherein the roller tube is additively constructed and wherein at least one layer producing the first portion is staggered with at least one layer producing the second portion.

2. The roller tube of claim 1, wherein the first portion is in a central region of the roller tube.

3. The roller tube of claim 2, wherein the first portion has a relatively higher tensile modulus than the second portion.

4. The roller tube of claim 2, wherein the first portion has a relatively lower tensile modulus than the second portion.

5. The roller tube of claim 2, wherein the second portion is symmetrically divided by the first portion.

6. The roller tube of claim 2, wherein the second portion is asymmetrically divided by the first portion.

7. The roller tube of claim 1, wherein the at least one layer producing the first portion is carbon fiber and the at least one layer producing the second portion is fiberglass.

8. The roller tube of claim 1, wherein the at least one layer producing the first portion and the at least one layer producing the second portion are carbon fiber.

9. The roller tube of claim 8, wherein the at least one layer producing the first portion is high modulus carbon fiber having a tensile modulus of 55 MSI or higher and the at least one layer producing the second portion is low modulus carbon fiber having a tensile modulus of about 34 MSI.

10. A method of making a variable-stiffness roller tube for a motorized window treatment, the method comprising:
- additively constructing a first tube by depositing layers on a tubular member;
- providing, on the first tube, a first portion exhibiting a first material stiffness;
- providing, on the first tube, a second portion exhibiting a second material stiffness that is different from the first material stiffness; and
- staggering, at an interface of the first portion and the second portion, at least one layer producing the first portion with at least one layer producing the second portion.

11. The method of claim 10, further comprising symmetrically dividing the second portion on either side of the first portion.

12. The method of claim 10, further comprising asymmetrically dividing the second portion on either side of the first portion.

13. The method of claim 10, wherein the tubular member is a mandrel.

14. The method of claim 13, wherein the mandrel is configured to define one or more splines in an inner surface of the first tube.

15. The method of claim 10, wherein the tubular member is a metal tube.

16. The method of claim 10, wherein the at least one layer producing the first portion is carbon fiber and the at least one layer producing the second portion is fiberglass.

17. The method of claim 10, wherein the at least one layer producing the first portion and the at least one layer producing the second portion are carbon fiber having different tensile moduli.

18. A motorized window treatment, comprising:
- a motor drive unit;
- a roller tube operably coupled to the motor drive unit, the roller tube comprising:
  - a first portion exhibiting a first material stiffness;
  - a second portion exhibiting a second material stiffness that is different from the first material stiffness; and
  - an interface of the first portion and the second portion, wherein the roller tube is additively constructed and wherein at least one layer producing the first portion is staggered with at least one layer producing the second portion; and a flexible material attached to the roller tube, the flexible material operable between a raised position and a lowered position via rotation of the roller tube by the motor drive unit.

19. The motorized window treatment of claim 18, wherein the first portion is in a central region of the roller tube and has a relatively higher tensile modulus than the second portion.

20. The motorized window treatment of claim 18, wherein the second portion is symmetrically divided by the first portion, such that there are two interfaces.

* * * * *